United States Patent
Tanaka et al.

(10) Patent No.: US 6,869,012 B2
(45) Date of Patent: Mar. 22, 2005

(54) BILL PROCESSING APPARATUS WITH CREDIT CARD READER

(75) Inventors: Hideo Tanaka, Tokyo (JP); Shigeru Yasuda, Tokyo (JP)

(73) Assignee: Kabushiki Kaisha Nippon Conlux, Toyko (JP)

( * ) Notice: Subject to any disclaimer, the term of this patent is extended or adjusted under 35 U.S.C. 154(b) by 0 days.

(21) Appl. No.: 10/277,282

(22) Filed: Oct. 22, 2002

(65) Prior Publication Data

US 2003/0094488 A1 May 22, 2003

(30) Foreign Application Priority Data

Nov. 16, 2001 (JP) ........................................ 2001-351682

(51) Int. Cl.⁷ ................................................ G06K 5/00
(52) U.S. Cl. ...................... 235/380; 235/375; 235/381; 235/383; 235/449; 235/453
(58) Field of Search ................................ 235/375, 380, 235/381, 383, 449, 453, 487

(56) References Cited

U.S. PATENT DOCUMENTS

| | | | | |
|---|---|---|---|---|
| 4,900,906 A | * | 2/1990 | Pusic | 235/381 |
| 5,635,696 A | * | 6/1997 | Dabrowski | 235/449 |
| 5,868,236 A | * | 2/1999 | Rademacher | 194/217 |
| 6,070,802 A | * | 6/2000 | Yi | 235/475 |
| 6,129,275 A | * | 10/2000 | Urquhart et al. | 235/381 |
| 6,296,182 B1 | * | 10/2001 | Ota et al. | 235/379 |

FOREIGN PATENT DOCUMENTS

| | | |
|---|---|---|
| JP | 10091851 | 4/1998 |
| JP | 11259716 | 9/1999 |
| JP | 11328319 | 11/1999 |
| JP | 11328499 | 11/1999 |
| JP | 2000030116 | 1/2000 |
| JP | 2000207610 | 7/2000 |
| JP | 2001126121 | 5/2001 |
| JP | 2001222744 | 8/2001 |
| JP | 2001266229 | 9/2001 |

* cited by examiner

Primary Examiner—Steven S. Paik
(74) Attorney, Agent, or Firm—Welsh & Katz, Ltd.

(57) ABSTRACT

A bill processing apparatus with a credit card reader is configured such that a credit card insert slot (9) for inserting a credit card (50) therein is formed in the upper surface of a front mask (5), a credit card guide chute (20) connected to the credit card insert slot (9) is formed in the front mask (5) so as to be connected to a bill guide chute (8), and the lower surface (8b) of this bill guide chute (8) is bent so as to be proximate to the lower surface (5c) of the front mask, and when the credit card (50) is inserted into the credit card insert slot (9), the credit card (50) enters the bill insert slot (8) by way of the credit card guide chute (20) and reaches the lower surface (8b) of the bill guide chute (8), whereby credit card data can be stably read inside a front mask without changing the size of a conventional standardized front mask.

4 Claims, 7 Drawing Sheets

US 6,869,012 B2

BILL PROCESSING APPARATUS WITH CREDIT CARD READER

BACKGROUND OF THE INVENTION

1. Field of the Invention

The present invention relates to a bill processing apparatus used in vending machines, change machines, service equipment, and the like for distinguishing the authenticity of bills and storing authentic bills, and more particularly to a bill processing apparatus with a credit card reader for reading data recorded on a credit card.

2. Description of the Related Art

Bill processing apparatuses are generally installed in vending machines, change machines, service equipment, and the like for distinguishing the authenticity of bills inserted for the purchase of a product, and storing authenticated bills inside a stacker.

It has also been proposed in recent years that a credit card reader comprising a magnetic head or other component for accessing and reading data recorded on the magnetic strip of a credit card be disposed inside the front mask of a conventional bill processing apparatus to allow transaction settlement using credit cards as well as bills, and easy purchase of articles from vending machines.

However, for a magnetic head in the above-mentioned credit card reader to accurately read the data recorded on a credit card, the credit card must be greatly moved so that the magnetic head is able to adequately scan the magnetic strip formed in the lengthwise direction of the credit card.

In such a case, when it is so constructed that the credit card guide chute for guiding the credit card inside the front mask of a bill processing apparatus is formed with adequate length to allow sufficient scanning of the magnetic strip by the magnetic head so that the movement distance of the credit card is thusly substantially ensured, difficulties arise that not only the outer dimensions of the front mask of the bill processing apparatus inevitably become larger, but also this larger front mask cannot be mounted into the front mask attachment hole, which is formed in advance in a standardized size in the door or other part of the vending machine.

SUMMARY OF THE INVENTION

In view of the situation described above, an object of the present invention is to provide a bill processing apparatus with a credit card reader for reliably reading data on a credit card, which can be mounted inside a conventional standardized front mask without changing the size of the front mask.

To achieve the above-stated object, the present invention provides a bill processing apparatus with a credit card reader, wherein the credit card reader that reads data recorded on a credit card is disposed inside a front mask in which a bill insert slot and a bill guide chute having upper and lower surfaces and connected to the bill insert slot are formed, comprising a credit card insert slot formed in an upper surface of the front mask, for inserting the credit card therein, and a credit card guide chute formed inside the front mask, with one end thereof being connected to the credit card insert slot and another end being connected to the bill guide chute, the lower surface of the bill guide chute being bent so as to be proximate to a lower surface of the front mask, whereby the credit card reaches the lower surface of the bill guide chute by way of the credit card guide chute when the credit card is inserted in the credit card insert slot.

DESCRIPTION OF THE EMBODIMENTS

An embodiment of the bill processing apparatus with a credit card reader according to the present invention is described below.

Figure 1:
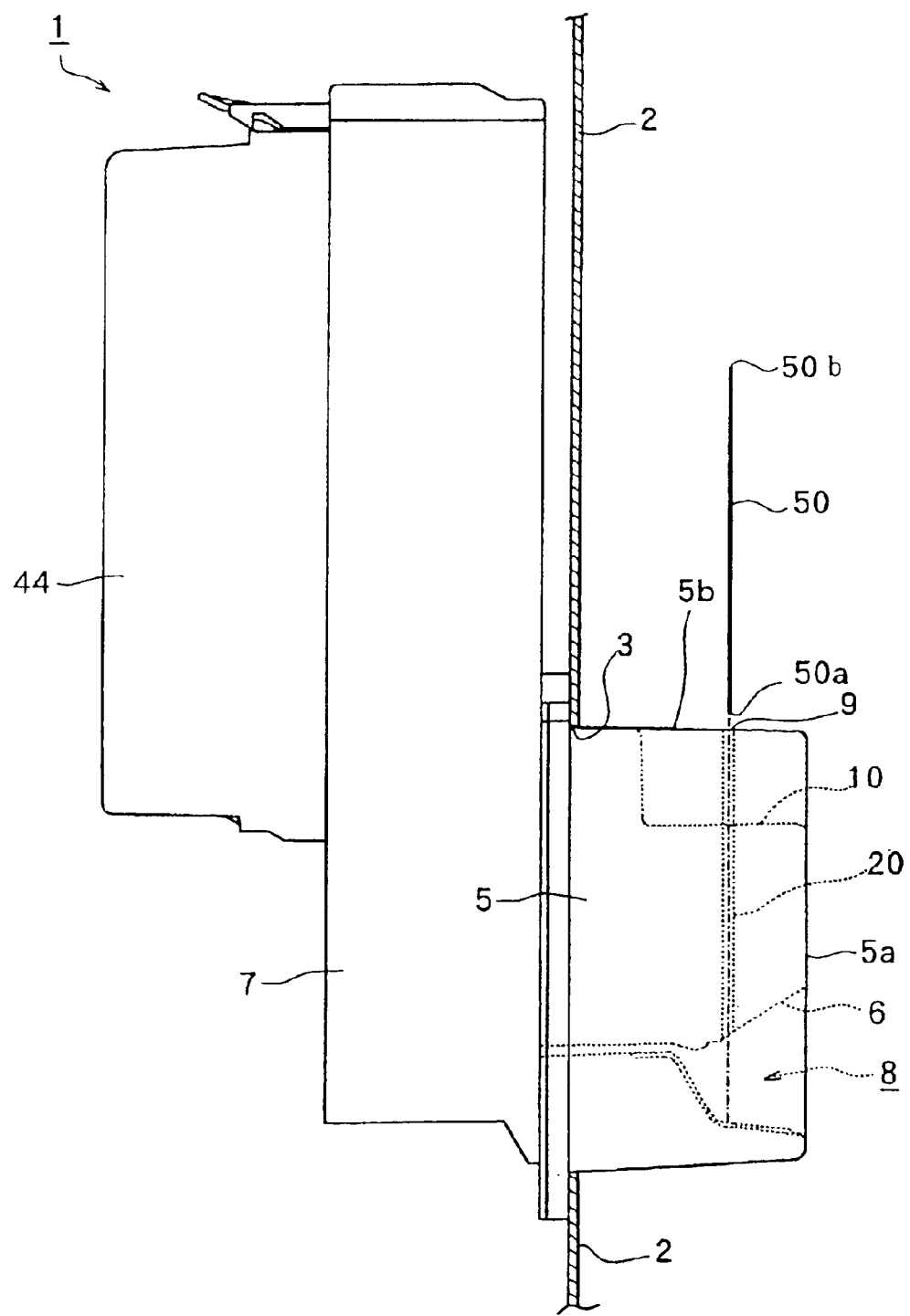
FIG. 1 is a schematic view illustrating a bill processing apparatus with a credit card reader according to an embodiment of the present invention.

FIG. 1 is a schematic side view of a bill processing apparatus 1 according to an embodiment of the present invention. FIG. 1 depicts, in particular, a configuration with a front mask 5 of the bill processing apparatus 1 mounted into a front mask attachment hole 3 of a door 2 of a vending machine or other apparatus for selling products. The size (vertical and horizontal dimensions) of the attachment hole 3 of this front mask is standardized in advance, and is capable of having various types of bill processing apparatus mounted therein.

A bill insert slot 6 is formed in the front surface 5a of the front mask 5 of this bill processing apparatus 1 in the same manner as in conventional apparatus. Inside the front mask 5, a bill guide chute 8 for guiding inserted bills into the device main body 7 is formed and is connected to the bill insert slot 6.

Figure 2:
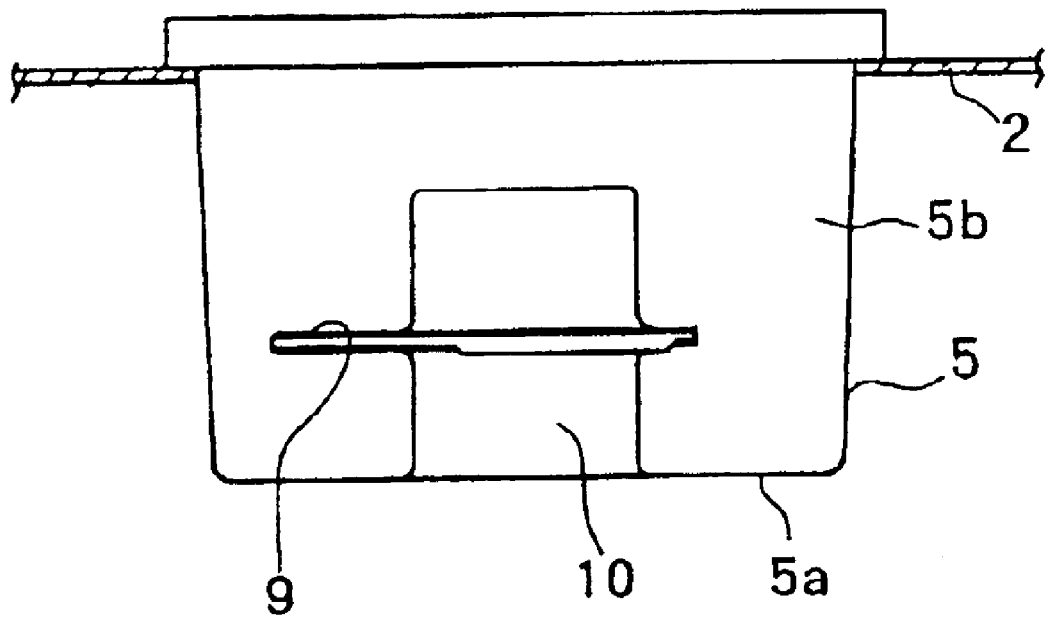
FIG. 2 is a top view of the front mask.

As shown in FIG. 1 and FIG. 2, which is a top view of the front mask 5, a slit-shaped credit card insert slot 9 for receiving credit cards is formed in a upper surface 5b thereof. Between the front mask upper surface 5b and the front surface 5a across a section spanning the credit card insert slot 9, a concave fingerhold 10 for allowing the credit card inserted in the credit card insert slot 9 to be grasped and easily removed is formed.

As shown in front view of the bill processing apparatus 1 in FIG. 3, an liquid crystal display (LCD) 11 is disposed on the front surface 5a thereof for displaying various data (such as the acceptance or the rejection and so forth of the credit card) from the credit card reader described hereinafter.

Figure 3:
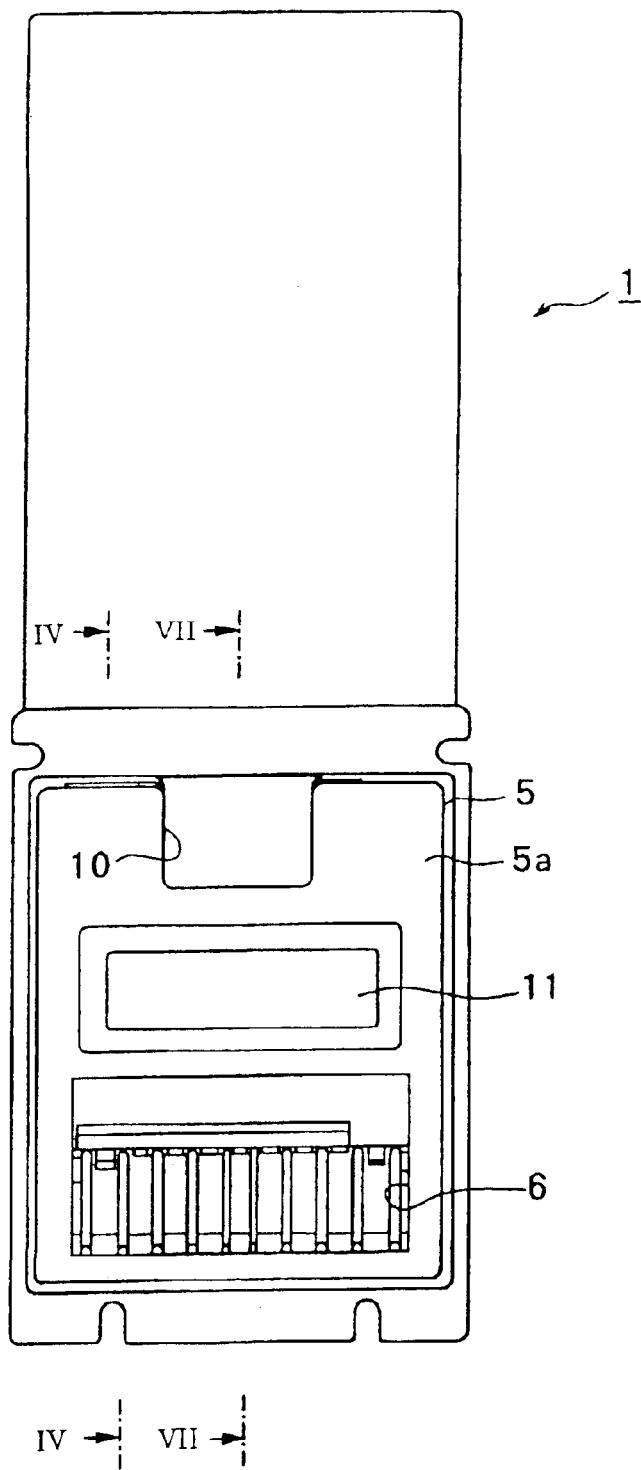
FIG. 3 is a front view of the bill processing apparatus with a credit card reader according to the embodiment of present invention.
Figure 4:
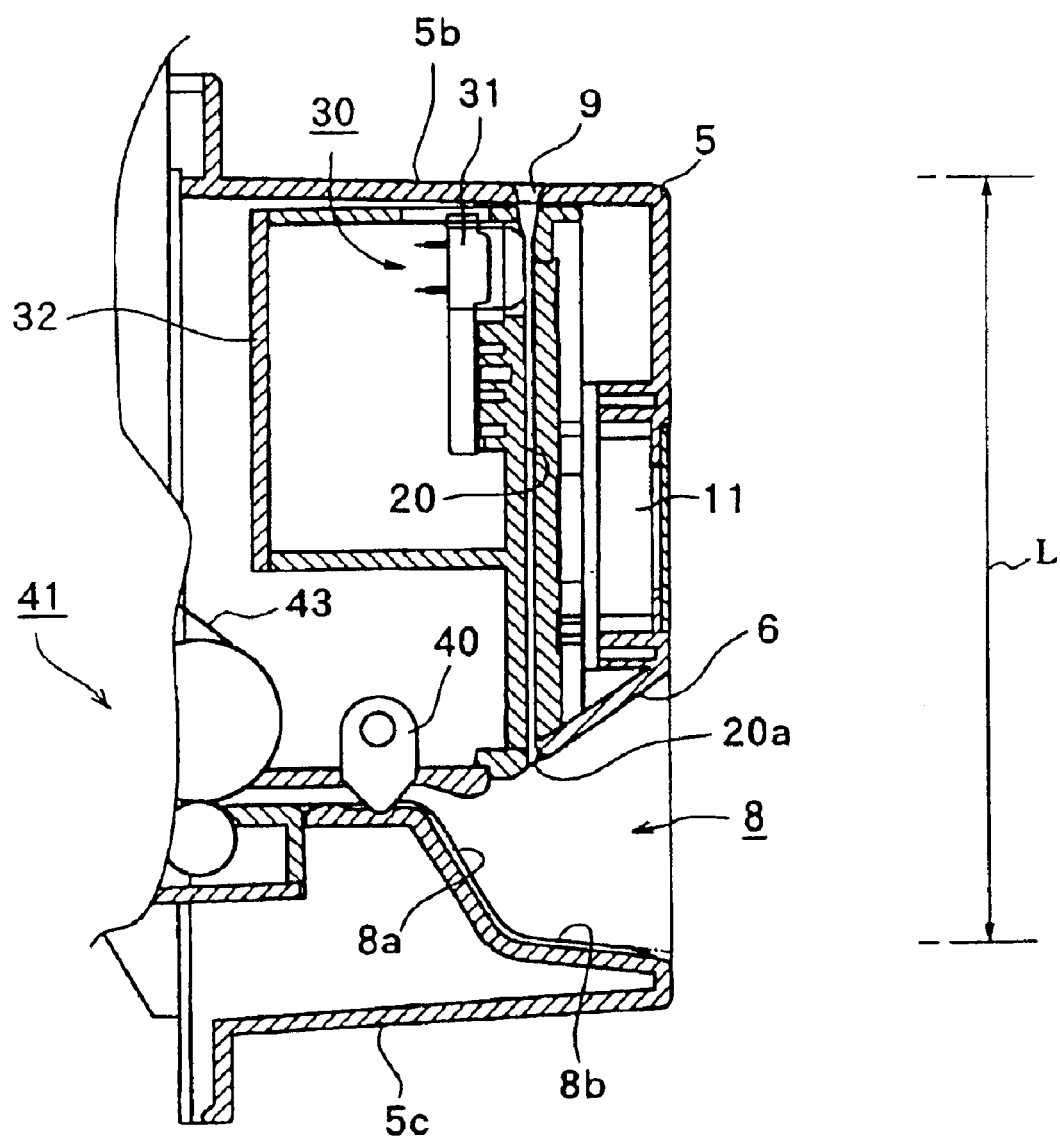
FIG. 4 is an enlarged cross-sectional view of FIG. 3 along the line IV—IV.

As shown in FIG. 4, which is an enlarged cross-sectional view of along the line IV—IV of FIG. 3, a credit card guide chute 20 connected to the credit card insert slot 9 is formed in the front mask 5, and a back end 20a thereof is connected to the bill guide chute 8, which is itself connected to the bill insert slot 6.

A magnetic head 31, which is a principle component of a credit card reader 30, is disposed inside the front mask 5 proximate to the credit card guide chute 20 in a position proximate both to the credit card insert slot 9 and to the upper surface 5b of front mask 5.

This credit card reader 30 is accommodated by a box 32 for partitioning the inside of front mask 5 to minimize damage from dust and rain drops.

As part of a lower chute 8a constituting the lower surface of the bill guide chute 8 described above, a lower chute 8b located at a position facing the back end 20a of the credit card guide chute 20 is bent to a position proximate to a lower surface 5c of the front mask 5. With this construction, a large length L is thereby secured between the credit card insert slot 9 and the lower chute 8b of the bill guide chute 8.

In FIG. 4, 40 is a bill detecting sensor for detecting the insertion of bills inside the bill insert slot 6, 41 is a bill transport means comprising a bill transport belt 43 or other component for transporting inserted bills inside the device main body 7 (FIG. 1). In FIG. 1, 44 is a stacker for storing authenticated bills.

The operation of the bill processing apparatus 1 is now described.

According to this bill processing apparatus 1, the operator (not shown) grasps a trailing edge 50b of a credit card 50 with his/her fingers, and inserts a leading edge 50a into the credit card insert slot 9 of the front mask 5 when the credit card 50 is used, as shown in FIG. 1.

Figure 5:
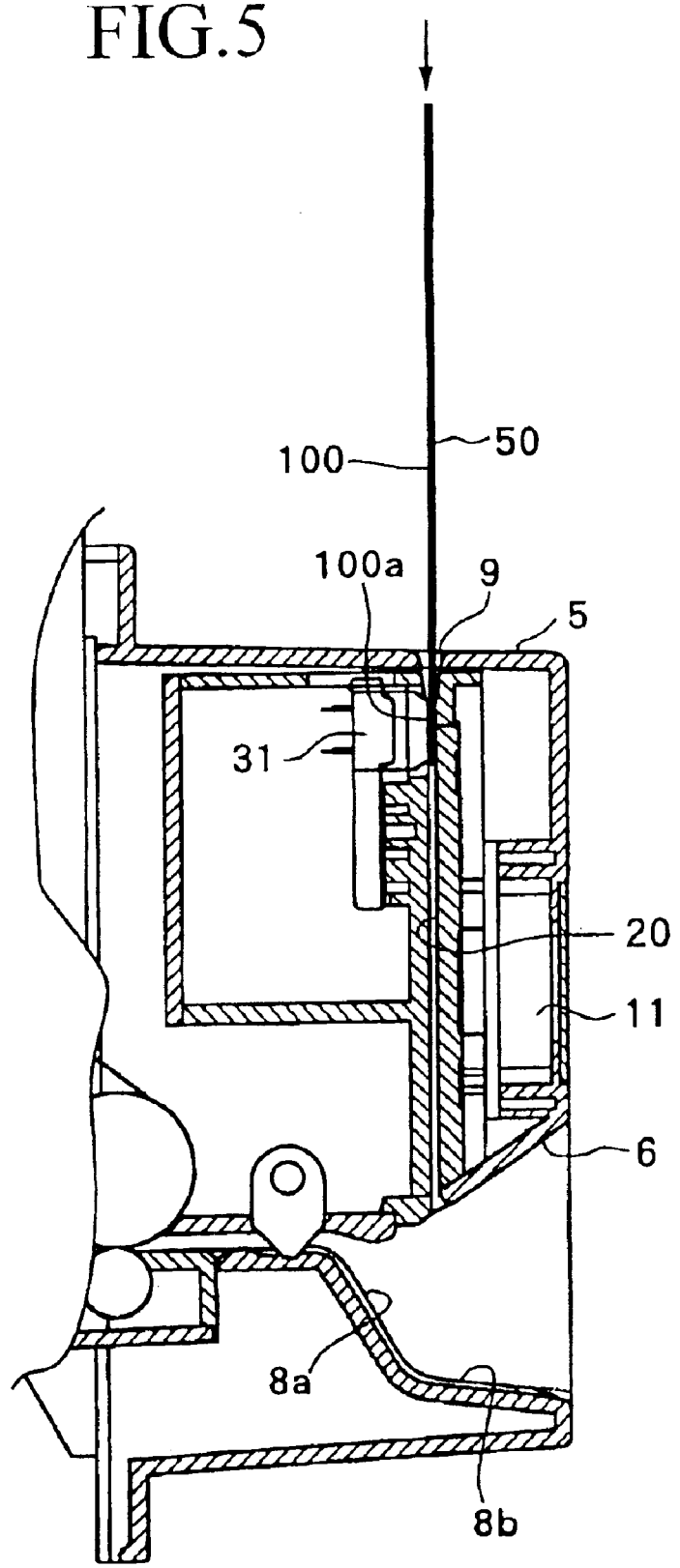
FIG. 5 is an enlarged cross-sectional view illustrating the operation of the bill processing apparatus with a credit card reader according to the embodiment of the present invention.

As shown in the fragmentary enlarged cross-sectional view of the front mask 5 in FIG. 5, the reading of the data recorded on a magnetic strip 100 begins immediately after the insertion of the credit card 50 because the leading edge 100a of the magnetic strip 100 formed in the lengthwise direction of the credit card 50 immediately comes into contact with the magnetic head 31 disposed at a position adjacent to the credit card insert slot 9.

Figure 6:
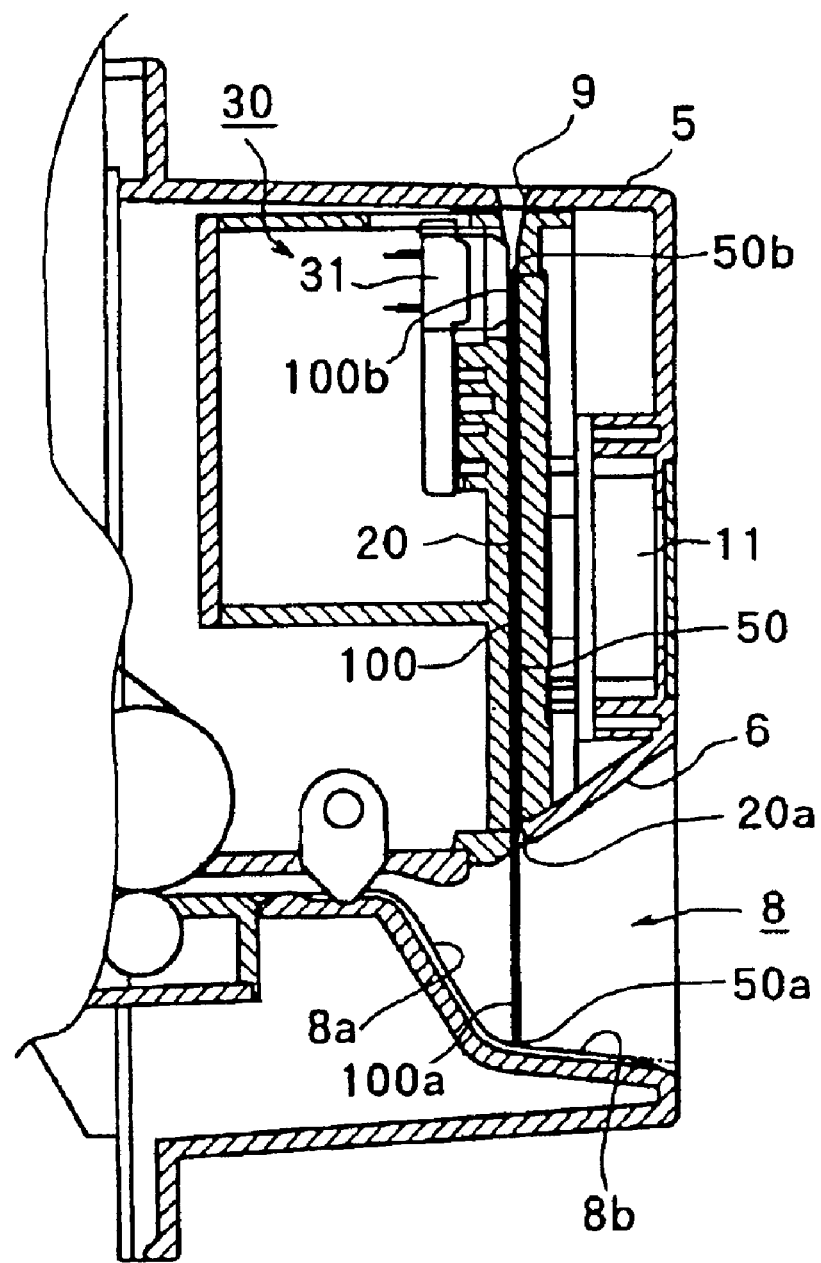
FIG. 6 is an enlarged cross-sectional view illustrating the operation of the bill processing apparatus with a credit card reader according to the embodiment of the present invention.

When the credit card 50 in the position shown in FIG. 5 is pressed downward into the front mask 5, the credit card 50 descends through the credit card chute 20, the leading edge 50a protrudes from the back end 20a of the credit card guide chute 20 as shown in FIG. 6, abuts against the lower chute 8b of the bill guide chute 8, and comes to a stop.

As shown in FIG. 6, when the leading edge 50a of the credit card 50 abuts the lower chute 8b of the bill guide chute 8 and comes to a stop, the data recorded from the leading edge to the trailing edge of the magnetic strip 100 formed in the lengthwise direction of the credit card 50 is entirely scanned by the magnetic head 31 of the credit card reader 30 because the trailing edge 50b of the credit card 50 makes contact with the magnetic head 31, and the data can be reliably read.

Figure 7:
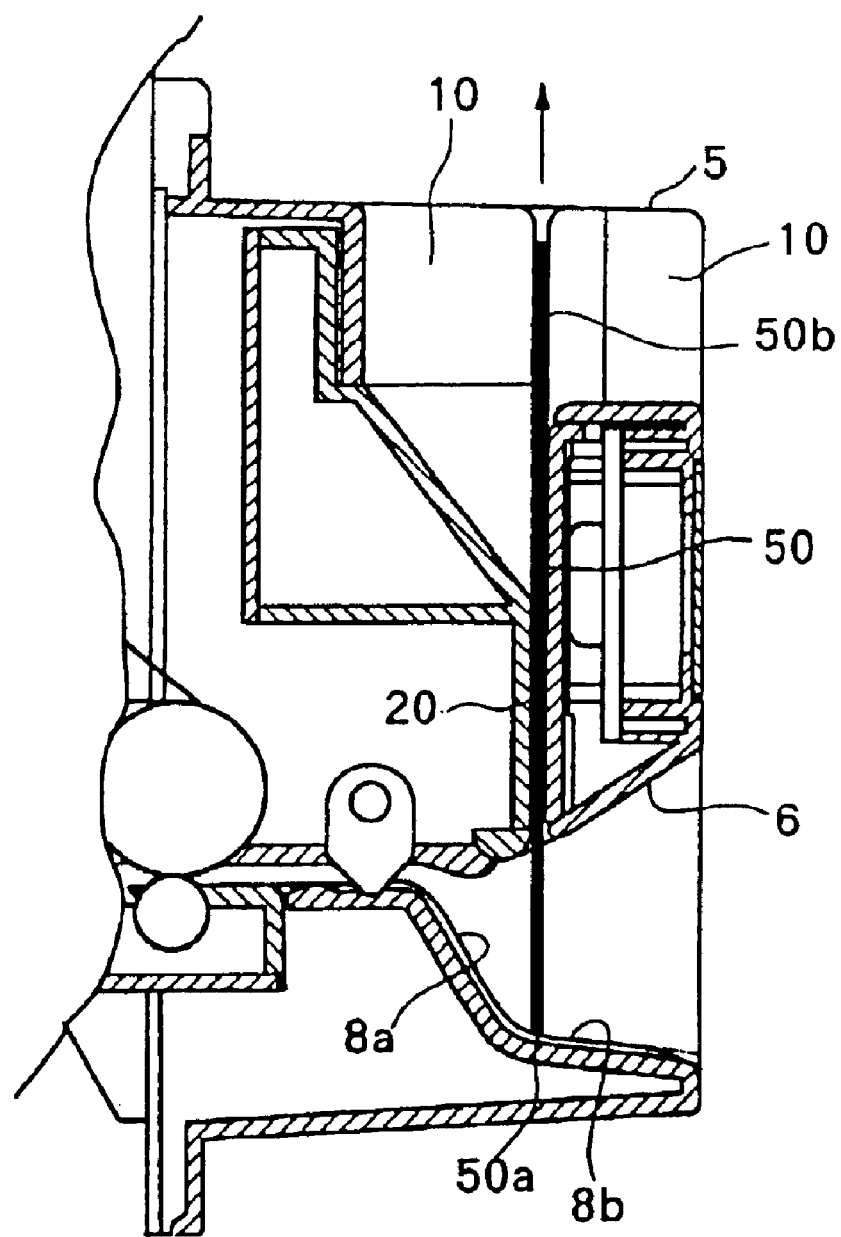
FIG. 7 is an enlarged cross-sectional view along the line VII—VII, illustrating the operation of the bill processing apparatus with a credit card reader according to the embodiment of the present invention.

It should be mentioned that because the trailing edge 50b of the credit card 50 is exposed in the concave fingerhold 10 of the front mask 5, the operator can easily remove the credit card 50 from the credit card guide chute 20 of the front mask 5 by grasping this portion and lifting in the upward direction to remove the credit card 50, as shown in FIG. 7, which is an enlarged cross-sectional view of FIG. 3 along the line B—B.

Because the back end 20a of the credit card guide chute 20 connected to the credit card insert slot 9 formed in the upper surface of the front mask 5 is exposed to the bill guide chute 8 in the manner shown in FIG. 4, any rain drops or other contaminants that have entered the credit card insert slot 9 fall into the bill guide chute 8 by way of the back end 20a of the credit card guide chute 20, and exit by way of the bill insert slot 6.

When the credit card 50 is pressed into the front mask 5, bills can be prevented from being mistakenly inserted in the bill insert slot 6 while data on the credit card 50 is being read, because the bill insert slot 6 is covered by the credit card 50 as shown in FIG. 6.

Exit holes may be formed from the bill guide chute 8 toward the lower surface 5c of the front mask 5 to allow the rain drops to exit quickly.

In the above-described embodiment of the bill processing apparatus with a credit card reader according to the present invention, the leading edge of the credit card 50 reaches the lower surface of the bent bill guide chute 8b when the credit card is inserted into the credit card insert slot 9 because the credit card guide chute 20 connected to the credit card insert slot 9 formed on the upper surface of the front mask 5 is formed so as to connect to the bill guide chute 8, and the lower surface of this bill guide chute 8 is bent so as to be proximate to the lower surface of the front mask 5. An adequate movement distance is thereby ensured for the credit card 50 in the narrow front mask 5, and the magnetic head can adequately scan the magnetic strip 100 on the credit card 50.

Thus, a credit card reader can be installed in a front mask, and a bill processing apparatus with a credit card reader can be provided for stably reading credit card data without modifying the outer dimensions of a conventional standardized front mask.

The present invention may be implemented in various other forms without deviating from the spirit or principle characteristics thereof. The above-described embodiment on all points is no more than an example and is not limited in its interpretation. The scope of the present invention is shown in the claims and is not limited in any manner by the text of the specification. Changes or modifications associated within an equivalent scope of the claims are entirely within the scope of the present invention.

What is claimed is:

1. A bill processing apparatus with a credit card reader, wherein the credit card reader that reads data recorded on a credit card is disposed inside a front mask in which a bill insert slot and a bill guide chute having upper and lower surfaces and connected to the bill insert slot are formed, comprising:

a credit card insert slot formed in an upper surface of the front mask, for inserting the credit card therein; and a credit card guide chute formed inside the front mask with one end thereof being communicated with the credit card insert slot and another end communicating with the bill guide chute, the credit card guide chute extending in a direction that intersects with a direction in which a bill is guided in the bill guide chutes, the lower surface of the bill guide chute being bent so as to be proximate to a lower surface of the front mask whereby the credit card reaches the lower surface of the bill guide chute by way of the credit card guide chute when the credit card is inserted in the credit card insert slot.

2. The bill processing apparatus with a credit card reader according to claim 1, wherein a concave fingerhold is formed on the upper surface of the front mask where the credit card insert slot is formed.

3. A bill processing apparatus with a credit card reader, wherein the credit card reader that reads data recorded on a credit card is disposed inside a front mask in which a bill insert slot and a bill guide chute along a 1st plane having upper and lower surfaces and connected to the bill insert slot are formed, comprising:

a credit card insert slot formed in an upper surface of the front mask along a 2nd plane, for inserting the credit card therein, and a credit card guide chute formed inside the front mask, with one end thereof communicating with the credit card insert slot and another end communicating with the bill guide chute, the 2nd plane of the credit card guide chute intersecting with the 1st plane of the bill guide chute, whereby the credit card may travel the credit card guide chute to intersect the 1st plane and reach the lower surface of the bill guide chute.

4. A bill processing apparatus with a credit card reader, wherein the credit card reader that reads data recorded on a credit card is disposed inside a front mask in which a bill insert slot and a bill guide chute having upper and lower surfaces and connected to the bill insert slot are formed, comprising:

a credit card insert slot formed in an upper surface of the front mask, for inserting the credit card therein; and a credit card guide chute formed inside the front mask, with one end thereof communicating with the credit card insert slot and another end communicating with the bill guide chute, the credit card guide chute extending into the bill guide chute, whereby the credit card may extend past the upper surface of the bill guide chute and reach the lower surface of the bill guide chute by way of the credit ear card guide chute when the credit card is inserted in the credit card insert slot.

\* \* \* \* \*